(12) United States Patent
O'Maley et al.

(10) Patent No.: US 9,096,297 B2
(45) Date of Patent: Aug. 4, 2015

(54) ILLUMINATED VISIBILITY SYSTEMS AND ASSOCIATED METHODS

(71) Applicants: John Christian O'Maley, Pomeroy, OH (US); Mark David Brunton, Athens, OH (US)

(72) Inventors: John Christian O'Maley, Pomeroy, OH (US); Mark David Brunton, Athens, OH (US)

( * ) Notice: Subject to any disclaimer, the term of this patent is extended or adjusted under 35 U.S.C. 154(b) by 76 days.

(21) Appl. No.: 13/835,048

(22) Filed: Mar. 15, 2013

(65) Prior Publication Data

US 2013/0265788 A1 Oct. 10, 2013

Related U.S. Application Data

(60) Provisional application No. 61/620,557, filed on Apr. 5, 2012, provisional application No. 61/661,975, filed on Jun. 20, 2012.

(51) Int. Cl.

| *F21L 21/00* | (2006.01) |
| *B63B 45/04* | (2006.01) |
| *F21V 33/00* | (2006.01) |
| *F21L 4/00* | (2006.01) |
| *F21V 21/084* | (2006.01) |
| *B64D 47/06* | (2006.01) |
| *B63C 9/20* | (2006.01) |
| *B63B 45/00* | (2006.01) |
| *B63B 35/71* | (2006.01) |

(52) U.S. Cl.
CPC ............... *B63B 45/04* (2013.01); *B64D 47/06* (2013.01); *F21L 4/00* (2013.01); *F21V 21/084* (2013.01); *F21V 33/0008* (2013.01); *B63B 2035/715* (2013.01); *B63B 2201/08* (2013.01); *B63C 9/20* (2013.01); *B63C 9/21* (2013.01); *B64D 2203/00* (2013.01)

(58) Field of Classification Search
CPC ... F21W 2101/04; F21L 15/14; F21L 14/023; F21L 23/00; F21V 21/084; B63B 22/166; B63B 45/00; B63B 45/02; B63B 45/06
USPC .......................................... 362/147, 105, 164
See application file for complete search history.

(56) References Cited

U.S. PATENT DOCUMENTS

| 2,832,968 | A | * | 5/1958 | Knudsen ........................ 441/16 |
| 3,938,132 | A | | 2/1976 | Cunningham |
| 4,423,472 | A | | 12/1983 | Duthu |
| 4,884,173 | A | | 11/1989 | Cassidy |
| 5,537,299 | A | | 7/1996 | Perry |
| 6,126,299 | A | | 10/2000 | Hypes et al. |
| 6,170,959 | B1 | | 1/2001 | Richardson, III |
| 6,752,510 | B1 | * | 6/2004 | Appiah ........................ 362/106 |
| 6,953,260 | B1 | * | 10/2005 | Allen ............................ 362/194 |

(Continued)

*Primary Examiner* — Julie Bannan
(74) *Attorney, Agent, or Firm* — Dinsmore & Shohl LLP

(57) ABSTRACT

A visibility system includes a portable navigational lighting system including a housing and a light source located in the housing and being visible from outside the housing such that when the light source is illuminated at least one of a first and a second color is displayed. A quick connect and release bracket is connected to the housing. The quick connect and release bracket is configured to releasably connect to a mount bracket. The portable navigational lighting system is configured to display each of the first and second colors, the second color being different from the first color. A first mount bracket is located on a wearable structure. The first mount bracket is configured to releasably connect to the quick connect and release bracket.

15 Claims, 6 Drawing Sheets

(56) References Cited

U.S. PATENT DOCUMENTS

| | | | |
|---|---|---|---|
| 7,021,802 B1* | 4/2006 | Wyatt | 362/477 |
| 7,357,530 B2 | 4/2008 | Wang et al. | |
| 7,780,309 B2* | 8/2010 | McMillan et al. | 362/202 |
| 2003/0031030 A1 | 2/2003 | Simms | |
| 2007/0153504 A1* | 7/2007 | Thornhill | 362/157 |
| 2008/0316733 A1* | 12/2008 | Spartano et al. | 362/105 |
| 2009/0323317 A1* | 12/2009 | Spartano et al. | 362/105 |
| 2010/0177503 A1* | 7/2010 | Lau | 362/105 |

* cited by examiner

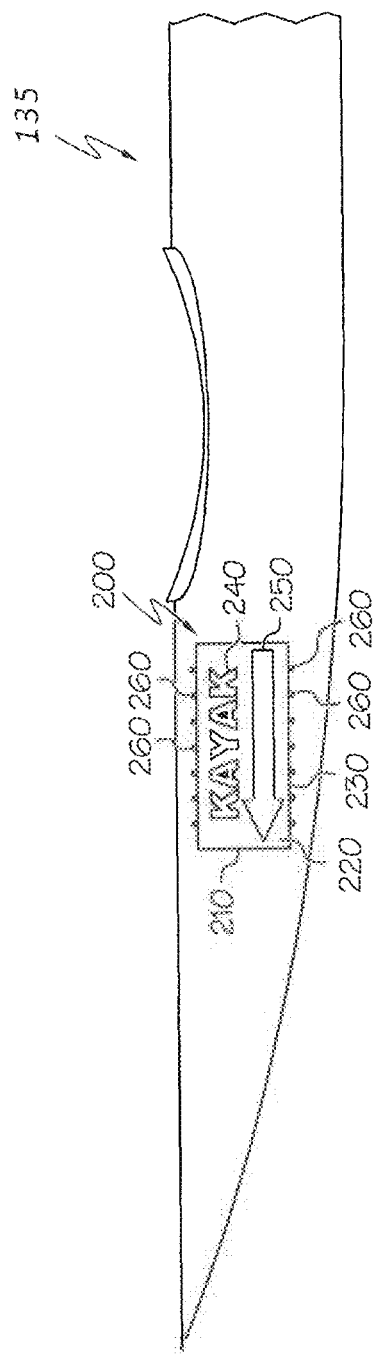

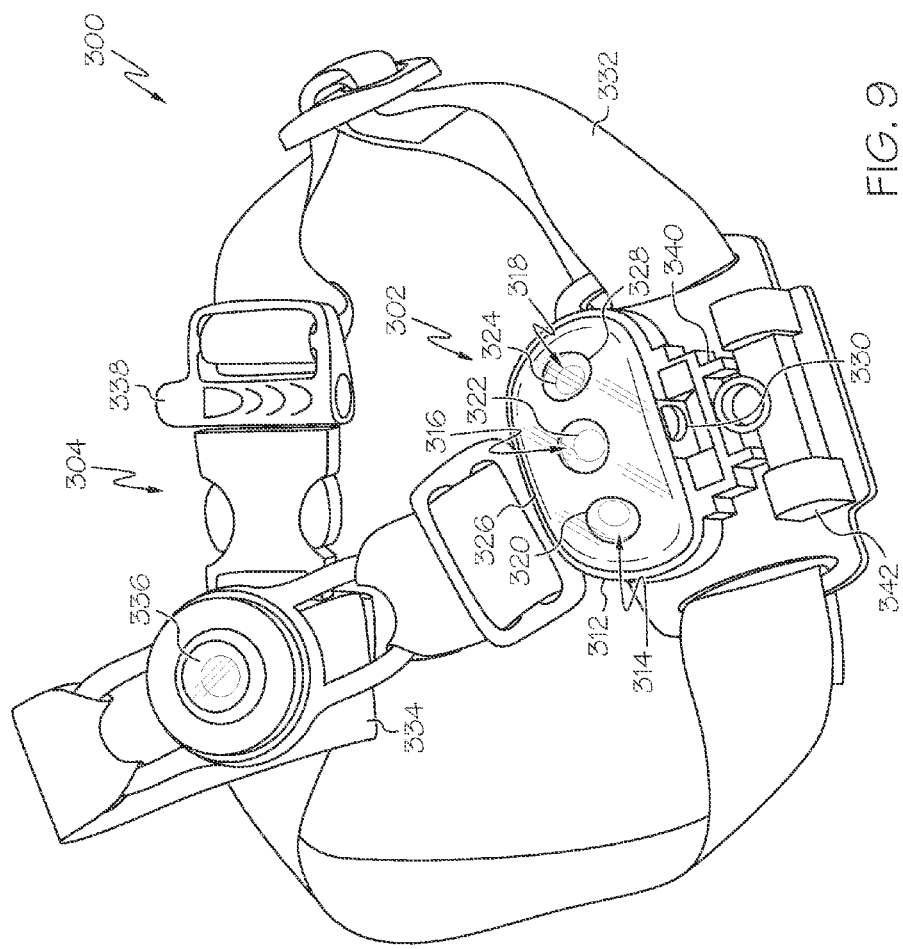

ILLUMINATED VISIBILITY SYSTEMS AND ASSOCIATED METHODS

CROSS-REFERENCE TO RELATED APPLICATIONS

This application claims priority under 35 U.S.C. §119 to U.S. Provisional Patent Application Ser. No. 61/620,557, filed Apr. 5, 2012, and to U.S. Provisional Patent Application Ser. No. 61/661,975, filed Jun. 20, 2012, the details of both of which are incorporated herein by reference in their entireties.

TECHNICAL FIELD

The present application relates illuminated visibility systems and methods of their use.

BACKGROUND

In various areas of the world, navigational lights are required for vessels, the requirements of which may depend on the size of the vessel. The requirements of navigational lights typically apply between sunset and sunrise or in low visibility conditions. For example, the United States Coast Guard requires power-driven vessels less than 39.4 feet in length to display red and green sidelights visible from a distance of at least one mile away on a dark clear night. Unpowered vessels less than 23 feet long exhibit the same lights as for powered vehicles less than 39.4 feet in length, if practical. Various other lighting requirements for vessels may be applicable, depending on the location.

SUMMARY

In one embodiment, a portable navigational lighting system includes a housing and a light source located in the housing and being visible from outside the housing such that when the light source is illuminated at least one of a first and a second color is displayed. A mount structure includes a quick connect and release bracket connected to the housing. The quick connect and release bracket is configured to releasably connect to a first mount bracket located on a wearable structure and a second mount bracket located on a structure other than the wearable structure. The portable navigational lighting system is configured to display each of the first and second colors. The second color is different from the first color.

In another embodiment, a visibility system includes a portable navigational lighting system including a housing and a light source located in the housing and being visible from outside the housing such that when the light source is illuminated at least one of a first and a second color is displayed. A quick connect and release bracket is connected to the housing. The quick connect and release bracket is configured to releasably connect to a mount bracket. The portable navigational lighting system is configured to display each of the first and second colors, the second color being different from the first color. A first mount bracket is located on a wearable structure. The first mount bracket is configured to releasably connect to the quick connect and release bracket.

In another embodiment, a method of using a portable navigational lighting system is provided. The method includes releasably attaching the portable navigational lighting system to a wearable structure. The portable navigational lighting system includes a housing and a light source located in the housing and being visible from outside the housing such that when the light source is illuminated at least one of a first and a second color is displayed. The portable navigational lighting system is configured to display each of the first and second colors. The second color is different from the first color. The portable navigational lighting system is removed from the wearable structure. The portable navigational lighting system is moved to a watercraft, structure other than watercraft or holding the portable navigational lighting system in hand for emergency lighting.

In another embodiment, a detachable and multi-purpose navigational lighting system includes boating navigation light sources meeting boating regulations for boats that can be (1) attached to one's body (for example, on a headband having a quick-release bracket for releasably receiving the boating light) and (2) to the boat itself, the boat having the quick-release bracket for receiving the boating light. The navigational lighting system may also include a wearable article, such as a head band, that may include one or more of a stern light and a cockpit light mounted thereto.

In another embodiment, a visibility system for recreational watercraft includes marine navigational light sources meeting boating regulations for boats that may be attached to a recreational watercraft, for example, a kayak, a canoe, a jon boat, and the like. The marine navigational light source sources may include a silicone body that is attached to the recreational watercraft. At least two lights may be included in the silicone body such that the marine navigational light source displays a red light along the port side of the vessel and a green light along the starboard side of the vessel. The marine navigational light source may include two light emitting diodes (LEDs) that act as the light source. The LEDs may be modified to emit navigational lights in accordance with marine regulations.

In another embodiment, a visibility system for recreational watercraft includes a high-visibility sheet that is applied to the recreational watercraft. The high-visibility sheet may include a photoluminescent material and/or a reflective material. The high-visibility sheet may take a variety of forms including a sheet, reflective film, and/or a structural panel. The high-visibility sheet includes indicia that indicates the type of vessel that the sheet is applied to, as well as the forward direction of travel of the vessel. The high-visibility sheet may emit and/or reflect light that is red or green, and are positioned on the appropriate side of the vessel according to the marine navigational regulations. The high-visibility sheet provides enhanced visibility of the recreational watercraft in low-light and/or low-visibility conditions.

The details of one or more embodiments are set forth in the accompanying drawings and the description below. Other features, objects, and advantages will be apparent from the description and drawings.

BRIEF DESCRIPTION OF THE DRAWINGS

FIG. 8 illustrates a side view of a recreational watercraft having a high-visibility sheet; and FIG. 9 illustrates another embodiment of a portable navigational lighting system connected to a head wearable article.

DETAILED DESCRIPTION

Embodiments described herein are generally directed to visibility systems for recreational watercraft, other recreational and non-recreational activities, such as during or in preparation for emergency situations. Human-powered recreational watercraft and all other non-motorized vessels may or may not be required to implement red- and green-colored navigation lights according to local regulations. However, embodiments according to the present disclosure allow such recreational watercraft to implement this red- and green-colored navigational light color scheme to improve visibility of the recreational watercraft. The visibility systems include elements that increase the visibility of the recreational watercraft in low-visibility conditions, for example, when operating the recreational watercraft at morning, dusk, or night-time conditions or other low-light and/or low visibility conditions. The visibility systems may include marine navigational light sources that are attached to the recreational watercraft and actively emit and/or reflect light in a pattern corresponding to the navigational regulations. The visibility systems may include high-visibility sheets that are attached to the recreational watercraft and reflect light that is directed towards the high-visibility sheets. Embodiments of the visibility systems will be described in more detail with reference to the appended drawings.

Some embodiments described herein are generally directed to visibility systems that include portable navigational lighting systems including navigational light schemes. The portable navigational lighting systems may include a housing that houses multiple light sources, where the light sources comply with marine navigation regulations and/or color schemes. The navigational lighting systems can be removably attached to one's body and also removably attached to a vehicle, such as a boat or other structure. Quick release brackets may be used to mount the navigational lighting systems to various structures.

Figure 1:
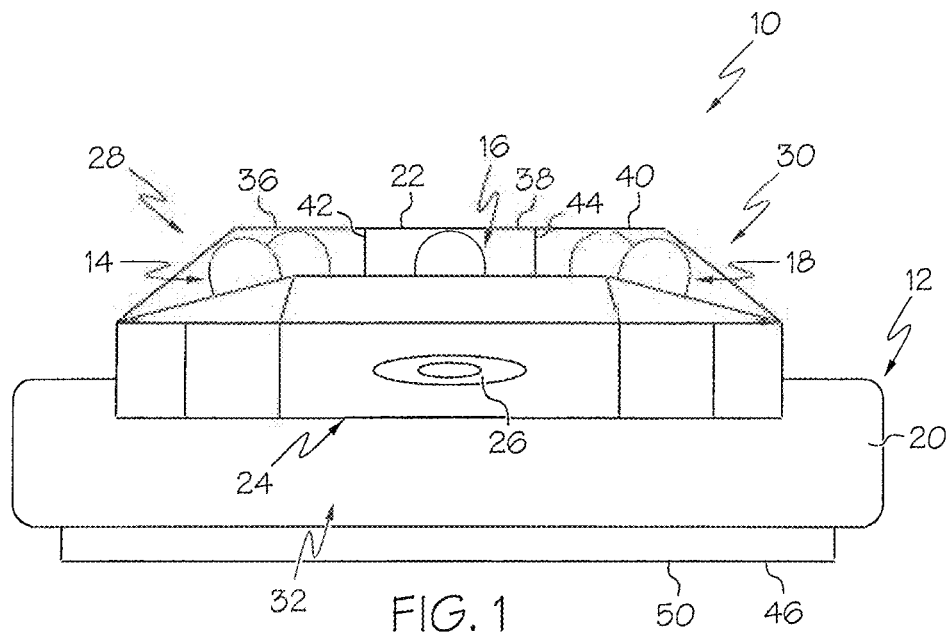
FIG. 1 illustrates a front view of an embodiment of a portable navigational lighting system.

Referring to FIG. 1, a portable navigational lighting system 10 includes a housing 12 that houses multiple light sources 14, 16 and 18. In the illustrated embodiment, one or more of the multiple light sources 14, 16 and 18 may produce light having a preselected color. For example, the light source 14 may be a red color, the light source 18 may be a green color and the light source 16 may be white. The colors of the light sources 14, 16 and 18 may be selected to comply with marine navigation regulations. Any suitable lighting source may be used, such as light-emitting diodes (LED). In other embodiments, a display, such as a liquid crystal display (LCD) may be used to provide the light sources and/or a color lens.

The housing 12 includes a base 20 and a cover 22 that is removably attached to the base 20. The cover 22 may be a unitary configuration or may comprise one or more components that are releasably attached to the base 20. The cover 22 may be formed of a transparent or translucent material, such as a plastic or glass, such that light from the light sources 14, 16 and 18 can be viewed from outside the portable navigational lighting system 10. In some embodiments, the cover may be formed of tinted glass and/or plastic (e.g., red and green) that may provide the navigational color scheme. In these embodiments, the light sources 14, 16 and 18 may all be white or some other preselected color. While multiple light sources 14, 16 and 18 are discussed above, in some embodiments, a single light source may be used to illuminate different color regions that are visible outside the housing 12, for example, using lenses, fiber optics or other suitable light directing features.

A user interface 24 may be provided that allows for control of the multiple light sources 14, 16 and 18. In the illustrated embodiment, an actuatable button 26 is provided that allows for turning the multiple light sources 14, 16 and 18 on and off. For example, the button 26 may be a multi-touch light switch that allows for activation and de-activation of each of the multiple light sources 14, 16 and 18 independently or together, depending on the number of times the button 26 is manually actuated. In some embodiments, the user interface 24 may allow for switching between each of the multiple light sources 14, 16 and 18 independently and repeatedly. For example, only one, some or all of the multiple light sources 14, 16 and 18 may be used at any one time. In some embodiments, the portable navigational lighting system 10 may have multiple settings that can be activated using the user interface 24 such as on/off, flash, blink, etc. In some embodiments, the portable navigational lighting system 10 may include a whistle or speaker that allows for activation of sounds, such as a horn, whistle or alarm. In embodiments where the whistle is included, the whistle may produce sound from forced air and be mouth-operated or powered by other means. The button 26 may include touch sensors (e.g., resistive or capacitive touch sensors, surface acoustic wave sensors, infrared LED, photodetectors, piezoelectric transducers, etc.) that can be actuated by placing and/or pressing a tip of the finger on the button area. In these embodiments, the button 26 may not move. Instead, the button 26 may be indicated visually to identify where to place the finger. In other embodiments utilizing touch sensors, the button 26 may move, for example, to bring the finger or touching device into close proximity to the touch sensor.

Figure 2:
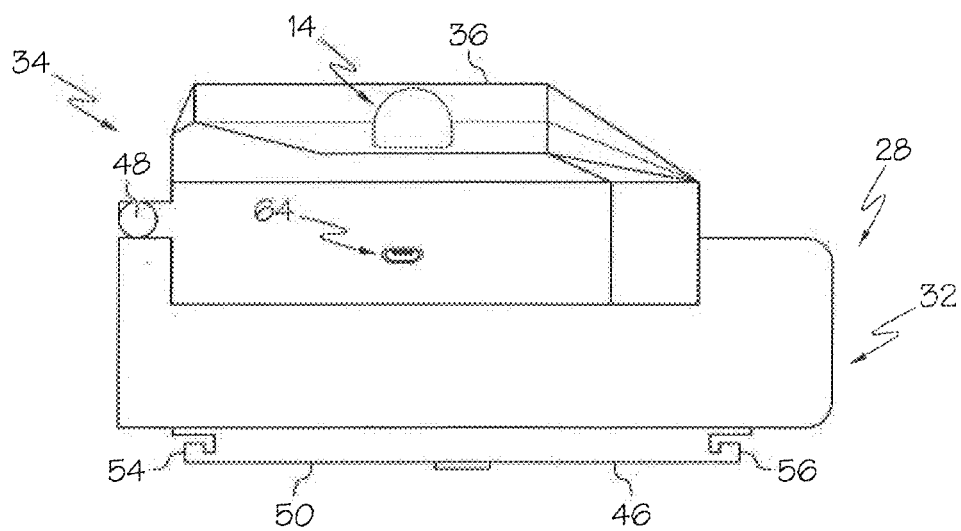
FIG. 2 illustrates a side view of the portable navigational lighting system of FIG. 1.

Referring also to FIG. 2, the cover 22 may be provided for allowing viewing of the light sources 14, 16 and/or 18 from the sides 28 and 30, the front 32 and/or the back 34 (e.g., 90 degrees) of the portable navigational lighting system 10. In one embodiment, the cover 22 includes a first covered section 36 that houses the light source 14, a second covered section 38 that houses the light source 16 and a third covered section 40 that houses the light source 18. The second covered section 38 may include barriers 42 and 44 that inhibit light from the light sources 14 and 18 from entering the other of the sections 36, 38 and 40. For example, the barriers 42 and 44 may be formed of or coated with a reflective material. In these embodiments, when viewing the portable navigational lighting system 10 from one of the sides 28 and 30 only or primarily the respective light source 14 and 18 associated with that side 14 or 18 can be seen.

Figure 3:
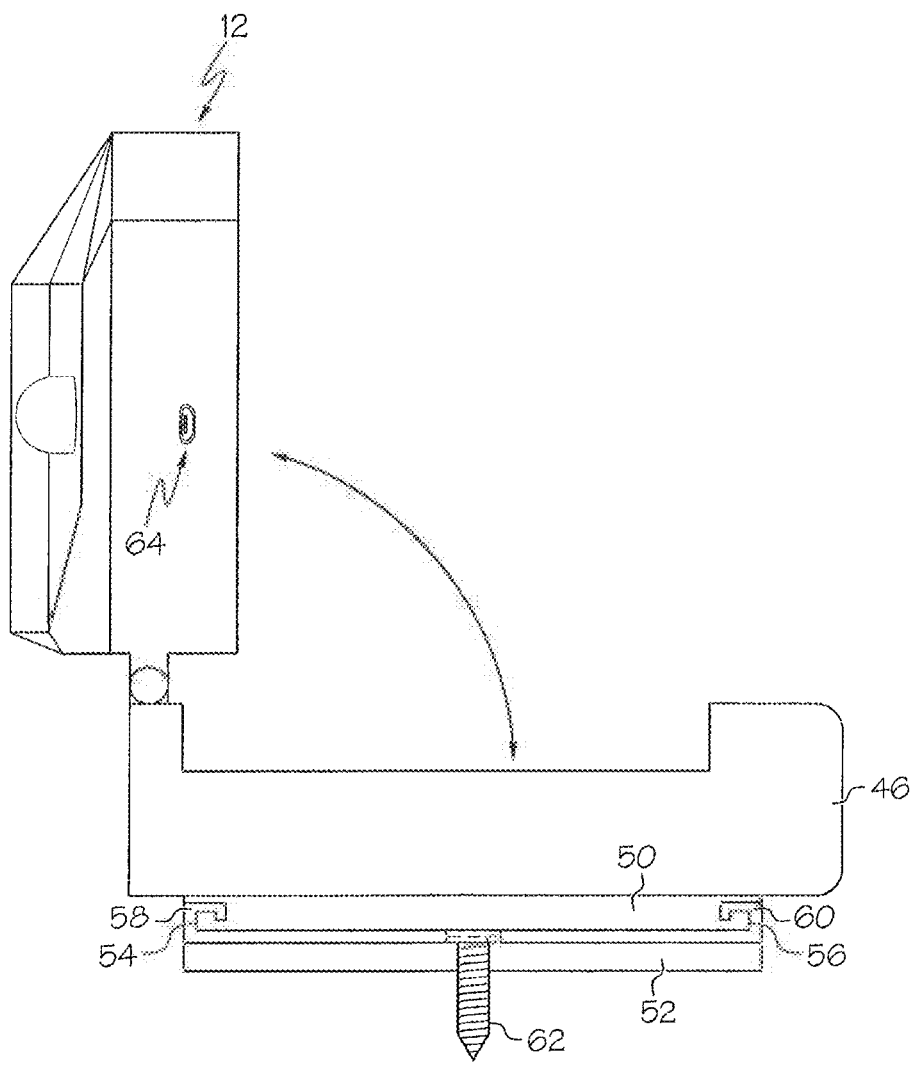
FIG. 3 illustrates another side view of the portable navigational lighting system of FIG. 1.

Referring to FIGS. 2 and 3, the base 20 may be pivotally connected to a mount structure 46 at a pivot location 48 or hinge. In other embodiments, the base 20 and mounting structure 46 are integrated as part of the same housing 12 as one unit and do not move relative to each other. The mount structure 46 may include a quick connect and release bracket 50 that can be releasably connected to a mounting bracket 52 (FIG. 3). In one embodiment, the bracket 50 may include slide rails 54 and 56 that can be received within tracks 58 and 60 of the bracket 52. Other quick release structures can be used, such as hook and loop fasteners, snaps, etc. The mount bracket 52 may be connected to a boat using a fastener 62 or other connecting means such as adhesive.

In some embodiments, the portable navigational lighting system 10 includes a charging mechanism 64. The charging mechanism 64 may be connected to a power source (e.g., a battery) located within the housing 12. The charging mechanism 64 may be, for example, a USB micro charging port. Other charging mechanisms may be used. In some embodiment, a solar panel may be provided for providing power to the portable navigational lighting system 10.

Figure 4:
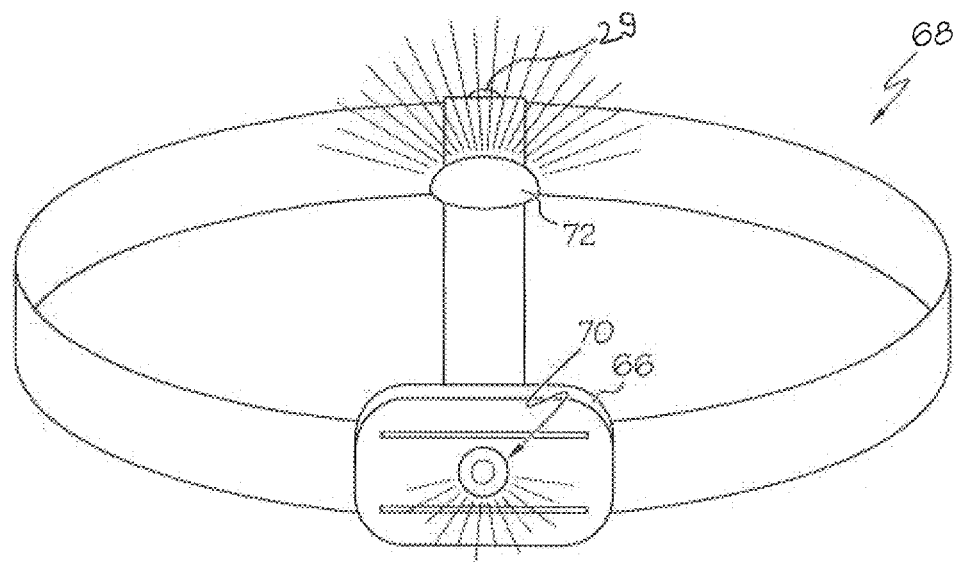
FIG. 4 illustrates an embodiment of a wearable structure for wearing the portable navigational lighting system of FIG. 1.

Referring to FIG. 4, a mount bracket 66 may be provided on a head strap 68 or other wearable structure. The mounting bracket 66 may include a light source 70 that becomes visible once the housing 12 removed from the mount bracket 66. A removable beacon 72 may also be provided on the head strap 68. The removeable beacon 72 may be located on top of the head strap 68 to allow 360 degrees of visibility of the removeable beacon 72 (i.e., a 360 degree beacon light) when in use. The removeable beacon 72 may also serve as a stern light for the visibility system. In some embodiments, the light source 70 may provide a cockpit light or a secondary headlamp available to the user after the housing 12 is removed. The removeable beacon 72 may provide a stern light available to the user.

The head strap may further include a whistle 29. The whistle 29 may be located at any suitable location on the head strap 68. In the illustrated embodiment, the whistle 29 is located at a back portion of the head strap 68 opposite the light source 70.

Figure 5:
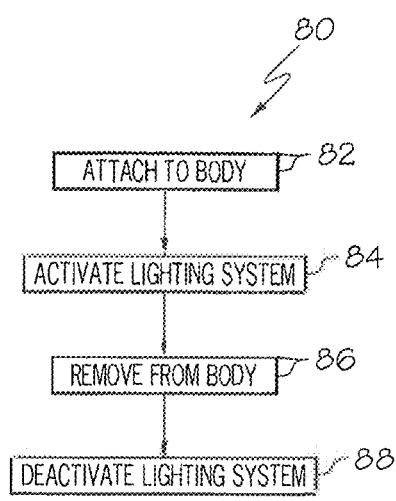
FIG. 5 illustrates a method of using the portable navigational lighting system of FIG. 1.

Referring now to FIG. 5 a method 80 of using the portable navigational lighting system 10 is illustrated. The method 80 includes attaching the portable navigational lighting system 10 to one's body, for example, using a hat or head strap at step 82. At step 84, the portable navigational lighting system 10 may be activated using the button 26 to illuminate one or all of the light sources 14, 16 and 18. At step 86 the portable navigational lighting system 10 may be removed from one's body using the mount structure 46 and then mounted to a boat using the mount bracket 52 already connected to the boat. The portable navigational lighting system 10 may then be deactivated at step 88.

The housing 12 may be water-resistant or waterproof to provide a water-resistant, portable navigational lighting system 10 that can be used around water. The portable navigational lighting system 10 can be integrated into a wearable structure such as a head strap so that the portable navigational lighting system 10 can be worn on a person's body. In some embodiments, the portable navigational lighting system 10 and/or head strap or other wearable structure may be buoyant to such that the portable navigational lighting system 10 and/or wearable structure float in water. In other embodiments, the portable navigational lighting system 10 and/or wearable structure may be submersible, such as for use during diving. The light sources 14, 16 and/or 18 may allow for improved viewing in darkness along with a navigational lighting function. The pivot location 48 may be provided for allowing the housing to be pivoted between different configurations relative to the mount structure 46 for increased viewing and visibility. In some embodiments, a remote may be provided that allows for remote control of the portable navigational lighting system 10. The remote may allow for wireless or wired control of the portable navigational lighting system 10. The portable navigational lighting system 10 may be used and controlled after the housing 12 is removed from the head strap 68 and the head strap 68 may include one or more light sources that, when used in combination with the housing 12 provide the portable navigational lighting system 10.

Figure 6:
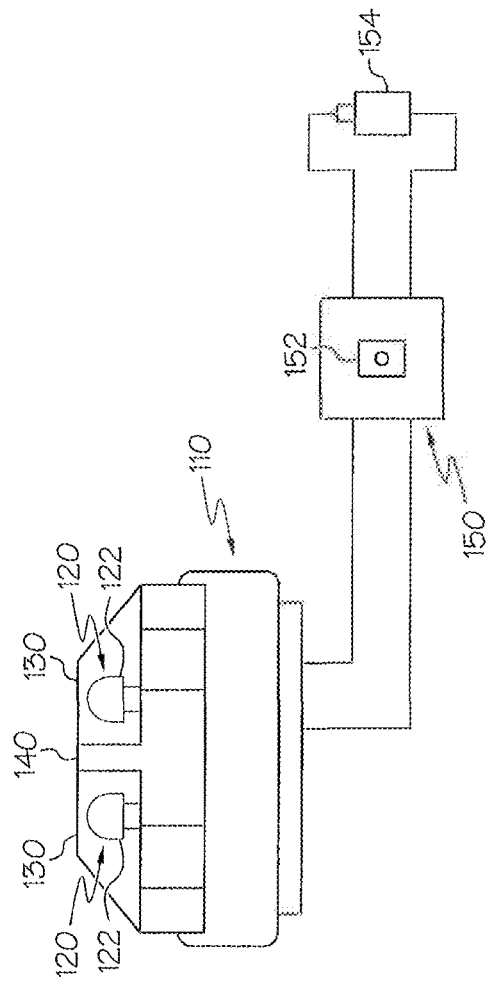
FIG. 6 illustrates a top view of an embodiment of a marine navigational light source according to one or more embodiments shown or described herein.

Referring now to FIG. 6, another portable navigational lighting system 100 is depicted. The portable navigational lighting system 100 includes a housing 110, inside of which multiple light sources 120 may be positioned. In one embodiment, the multiple light sources 120 may be light emitting diodes (LEDs) 122. The portable navigational lighting system 100 may be configured to actively emit light at two primary wavelengths: one corresponding to a green light and one corresponding to a red light. The colors emitted by the portable navigational lighting system 100 may be selected to comply with marine navigation regulations, as discussed above.

The housing 110 of the portable navigational lighting system 100 may be made from a variety of materials including polymers, such as silicones, synthetic rubbers, and the like. Housings 110 made from such materials may be resistant to water, while providing a durable exterior surface that provides a highly tack surface. The housing 110 may also include a plurality of covers 130 that are secured to the housing 110 and positioned to cover the multiple light sources 120. The covers 130 may be transparent such that light emitted from the multiple light sources 120 emits into the environment surrounding the portable navigational lighting system 100. In one embodiment, the covers 130 may be tinted to a color, for example, green or red, corresponding to the marine navigation regulations. In this embodiment, the tinted covers 130 may be used with LEDs 122 having a white or primarily white color cast. As the white light emitted by the LEDs is transmitted through the covers 130, the white light changes color casts as it interacts with the covers 130, such that the portable navigational lighting system 100 transmits colored lights. In yet other embodiments, tinted covers 130 may be used with LEDs 122 emitting light at colors that correspond to the color of the tinted covers 130, such that a LED 122 emitting a green light transmits the light through a green cover 130, and a LED 122 emitting a red light transmits the light through a red cover 130.

In another embodiment, the covers 130 may be clear, such that wavelength of the light emitted by the LEDs 122 is generally unaffected by transmitting through the covers 130. In this embodiment, the LEDs 122 each include a color cast, such as red or green, such that the portable navigational lighting system 100 produces light that complies with marine navigation regulations and/or universal emergency flashing pattern (e.g., SOS) or some other predetermined flashing pattern, such as patterns that can be used to attract bait or other wildlife. Circuitry and/or a controller may be used to control flashing of the light sources. In this embodiment, the portable navigational lighting system 100 may include a barrier 140 that separates the multiple LEDs 122, such that light from one LED does not leak from the cover 130 of the other LED 122. As such, the portable navigational lighting system 100 maintains separation of colored light emitted from the LEDs 122 in the appropriate position relative to the recreational watercraft 135.

In one embodiment of the portable navigational lighting system 100, the covers 130 may be secured to the housing 110 without further sealant positioned between the housing 110 and the covers 130. In this embodiment, the material of the housing 110 may be compliant, such that portions of the housing 110 deform to form a seal with the covers 130. The deformation of the housing 110 may provide a water-resistant and/or water-tight seal between the housing 110 and the covers 130. In another embodiment, sealant may be positioned between the housing 110 and the covers 130, such that the sealant or gasket deforms to fill any gaps between the housing 110 and the covers 130 as to provide a water-resistant and/or a water-tight seal between the housing 110 and the covers 130. In some embodiments, the housing 110 may be a unitary, molded piece.

Figure 7:
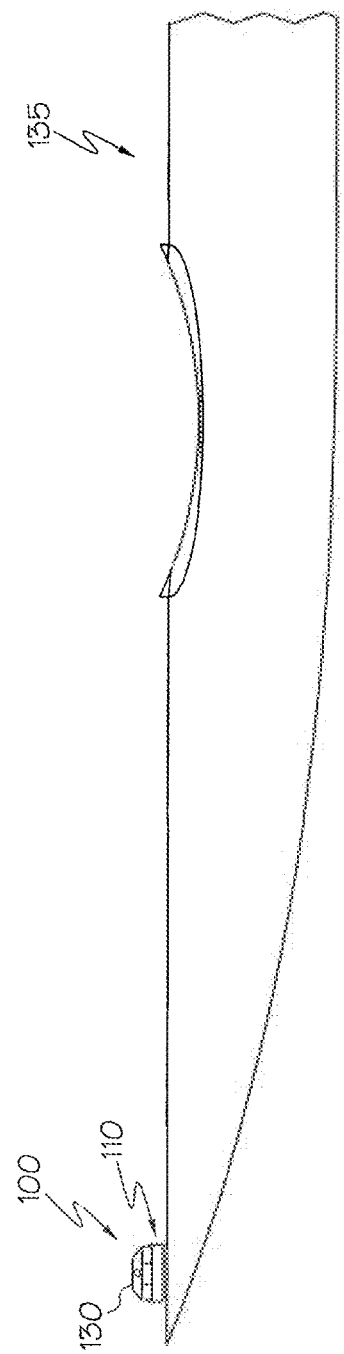
FIG. 7 illustrates a side view of a recreational watercraft having a marine navigational light source according to one or more embodiments shown or described herein.

Referring to FIG. 7, the portable navigational lighting system 100 may be mounted to the recreational watercraft 135 by a variety of attachment methods. In one embodiment, the portable navigational lighting system 100 is secured to the recreational watercraft 135 by a fastener. In another embodiment, a bracket is coupled to the recreational watercraft 135. The portable navigational lighting system 100 may be attached and removed from the bracket in a quick-connect and quick-disconnect configuration. The portable navigational lighting system 100 may also be secured to the recreational watercraft 135 using a hook-and-loop system. The hook-and-loop system may allow for repeated attachment and detachment of the marine navigational light source 100 to and from the recreational watercraft 135. In another embodiment, the portable navigational lighting system 100 may be secured to the recreational watercraft 135 using an adhesive. In yet another embodiment, portable navigational lighting system 100 may be secured to the recreational watercraft 135 using an extendible, elastic strap.

Referring again to FIG. 6, the portable navigational lighting system 100 may include an electronic controller 150 that is electrically coupled to the multiple light sources 120 and controls operation of the multiple light sources 120. The electronic controller 150 may be electrically coupled to a switch 152, for example, a push-button switch. An end-user of the portable navigational lighting system 100 may select operation of the portable navigational lighting system 100 by engaging the switch 152.

The electronic controller 150 may select operation of the multiple light sources 120 of the portable navigational lighting system 100. In one embodiment, the electronic controller 150 may have a plurality of operating conditions that an end-user may cycle through until the desired operating condition is in effect. For example, the electronic controller 150 may include a first operating condition in which the multiple light sources 120 are "off." The first operating condition may be used during daylight hours to conserve energy of the marine navigational light source. The electronic controller 150 may include a second operating condition in which the multiple light sources 120 are steadily illuminated. The second operating condition may be used during low-light and/or low-visibility conditions. The electronic controller 150 may include a third operating condition in which the multiple light sources 120 are periodically illuminated and extinguished such that the marine navigational light source 100 "flashes" in a regular and repeatable pattern. The third operating condition may be used to signal emergencies and/or to increase visibility of the portable navigational lighting system 100, for example when operating the recreational watercraft 135 in fog.

In some embodiments, the portable navigational lighting system 100 includes a charging mechanism 154. The charging mechanism 154 may be connected to a power source (e.g., a battery) located within the housing 110. The charging mechanism 154 may be, for example, a USB micro charging port. Other charging mechanisms may be used. In some embodiment, a solar panel may be provided for providing power to the portable navigational lighting system 100.

Embodiments of the portable navigational lighting system 100 according to the present disclosure may be incorporated into marine navigation light systems for marine vessels that are required to operate with navigation lights. Portable navigational lighting system 100 may operate separate of the electrical system of such marine vessels. The portable navigational lighting system 100 may be implemented as a back-up system for a hard-wired navigational light system of such marine vessels.

In some embodiments, the portable navigational lighting systems described herein may be for use in situations other than recreational boating, such as for emergency situations (e.g., as an emergency beacon and/or for navigational lighting). For example, the portable navigational lighting systems may be used on airplanes or other vehicles such as cruise ships. For airplanes, the portable navigational lighting systems may be provided or be available to passengers, for example, under seats, overhead and/or at other locations throughout the airplane. For cruise ships, the portable navigational lighting systems may be provided or be available in cabins or at other locations, such as on life boats. In case of an emergency, the occupants may obtain the portable navigational lighting systems and activate one or more of the light sources, which may signal an emergency and provide location information. In cases where the portable navigational lighting systems include a whistle or some other sound device, sounds may be generated using the portable navigational lighting systems. The portable navigational lighting systems may be used by emergency personnel such as police, fire fighters, in other occupations such as mining where additional lighting may be desirable, or recreational activities such as hunters, hikers, bikers, etc.

Referring now to FIG. 8, another embodiment of a visibility system for recreational watercrafts is depicted. In this embodiment, the visibility system includes a high-visibility sheet 200 that is applied to the recreational watercraft 135. In some embodiments, the high-visibility sheet 200 may be used in conjunction with one or more of the portable navigation lighting systems 10 and 100 described above. The high-visibility sheet 200 may include a backing 210 upon which a photoluminescent material 220 is applied. The photoluminescent material 220 may absorb light energy that is captured by the photoluminescent material 220 and subsequently emit and/or energy as light. In some embodiments, the photoluminescent material 220 may include a plurality of lenses that reflect the energy emitted from the photoluminescent material 220. In other embodiments, the high-visibility sheet 200 may include a reflective film that reflects light. In one embodiment, the high-visibility sheet 200 may be Oralite 5600 reflective film available from Oracal of Black Creek, Ga. The high-visibility sheet 200 may include an adhesive layer 230, for example, a pressure-sensitive adhesive that secures the high-visibility sheet 200 to the recreational watercraft 135.

In some embodiments, of the high-visibility sheet 200, the photoluminescent material 220 may be adapted to emit and/or reflect light at a wavelength corresponding to red and green as to comply with marine navigation regulations. Such red and green high-visibility sheets 200 may be secured to the recreational watercraft 135 along the appropriate port and starboard sides. The high-visibility sheets 200 may be positioned towards the front of the recreational watercraft 135. The red and green high-visibility sheets 200, therefore, may indicate to other watercraft the port and starboard sides of the recreational watercraft 135, along with the bow and the stern of the recreational watercraft 135.

Still referring to FIG. 8, the high-visibility sheet 200 may include a variety of indicia, which may improve identification of the recreational watercraft 135 at low-light and/or low visibility conditions. In the embodiment depicted in FIG. 2, the high-visibility sheet 200 includes vessel identifying indicia 240 that indicates the type of recreational watercraft 135 the high-visibility sheet 200 is attached to. In the depicted embodiment, the vessel identifying indicia 240 includes recitation of "KAYAK," however other vessel identifying indicia may include "CANOE," "JON BOAT," boat registration numbers, and the like.

The high-visibility sheet 200 may further include vessel direction of travel indicia 250 that indicates the forward direction of travel of the recreational watercraft 135. As depicted in FIG. 8, the high-visibility sheet 200 includes an arrowhead facing in the direction of forward travel of the recreational watercraft 135.

The high-visibility sheet 200 may be incorporated into a variety of structures associated with marine vessels. In one embodiment, the high-visibility sheet 200 may be incorporated into a panel that is secured to the marine vessel. In another embodiment, the high-visibility sheet 200 may be incorporated directly into the hull of the marine vessel. In some embodiments, the high-visibility sheet 200 may be incorporated into a laminate structure of the hull itself. In yet other embodiments, the high-visibility sheet 200 may be incorporated into accessories used with the marine vessel, for example, paddles, oars, marine fenders, fender covers, and the like.

In some embodiments, the high-visibility sheet 200 may further include a plurality of light emitting sources 260 that direct light onto the high-visibility sheet 200. The plurality of light emitting sources 260 enable the high-visibility sheet 200 to provide illumination in the appropriate marine navigational color scheme without requiring illumination of the high-visibility sheet 200 by a remote entity.

Referring now to FIG. 9, another embodiment of a visibility system 300 includes a portable navigational lighting system 302 and a head wearable article 304 (e.g., a head strap). The portable navigational lighting system 302 includes many of the features described above including a housing 312 that houses multiple light sources 314, 316 and 318 that produce light having a preselected color (e.g., red, white and green selected to comply with marine navigation regulations). Lenses 320, 322 and 324 may be used to focus and direct the light from the light sources 314, 316 and 318.

The housing 312 includes a base and mounting structure 326 and a cover 328 that may or may not be removably attached to the base and mounting structure 326. A user interface 330 may be provided to control operation of the light sources 314, 316 and 318, as discussed above.

The head wearable article 304 includes a base strap 332 that is received about a wearer's head and a top strap 334. The top strap 334 provides top structure that receives a 360 degree (e.g., white) beacon light 336. As described above, the 360 degree beacon light 336 can be seen in all directions when in use. In some embodiments, the beacon light 336 may be capable of flashing in a predetermined pattern or be continuously lighted. Various buckles 338 may be provided that allow for release, connect and adjustment of the head wearable article 304 to accommodate various head sizes.

A front mount bracket 340 may be provided to which the base and mounting structure 326 is attached (e.g., using a quick connect and release bracket). The front mount bracket 340 may be provided with a pivot location 342 that allows the portable navigational lighting system 302 to pivot relative to the front mount bracket 340. The head wearable article 304 may also include a sound device, such as a whistle (FIG. 4) that can be used to generate sounds, for example, in an emergency situation.

It should be understood that the visibility systems for recreational watercraft according to the present disclosure may include a marine navigational light source that provides navigational lighting according to marine regulations. The marine navigational light source may include a silicone body and a plurality of covers that encapsulate light sources to protect the light sources from the wet environment. In another embodiment, the visibility system may include a high-visibility sheet that is attached to the recreational watercraft and emits light in colors corresponding to marine navigation lighting requirements. The high-visibility sheet includes vessel identifying indicia that identify the type of recreational watercraft the high-visibility sheet is attached to, along with a vessel direction of travel indicia that indicates the forward direction of travel of the recreational watercraft. The visibility systems according to the present disclosure may increase the visibility of a recreational watercraft operating in a low-light and/or low-visibility condition.

It is to be clearly understood that the above description is intended by way of illustration and example only and is not intended to be taken by way of limitation, and that changes and modifications are possible.

What is claimed is:

1. A method of using a portable navigational lighting system, the method comprising:
    releasably attaching the portable navigational lighting system to a head wearable article including a top portion and a base portion sized to be received about a head of a user, the portable navigational lighting system comprising a housing and a light source located in the housing and being visible from outside the housing such that when the light source is illuminated at least one of a first and a second color is displayed, the portable navigational lighting system configured to display each of the first and second colors, the second color being different from the first color;
    removing the portable navigational lighting system from the head wearable article;
    moving the portable navigational lighting system to a watercraft, structure other than watercraft or holding the portable navigational lighting system in hand for emergency lighting; and
    activating a beacon light located at the top portion of the head wearable article such that the beacon light has 360 degrees of visibility when the head wearable article is worn and the beacon light is activated.

2. The method of claim 1 further comprising activating the light source while the portable navigational lighting system is attached to the head wearable article and activating the light source while the navigational lighting system is attached to a watercraft.

3. The method of claim 1 further comprising:
    attaching a first mount bracket to the head wearable article; and
    attaching a second mount bracket to a watercraft, the first and second mount brackets configured to releasably connect to the portable navigational lighting system.

4. The method of claim 1 further comprising attaching a high-visibility sheet comprising a photoluminescent material to a hull of the watercraft.

5. The method of claim 1, wherein the housing includes a base and a cover, wherein at least two light sources are located between the base and the cover such that when a first light source of the at least two light sources is illuminated the first color is displayed and when a second light source of the at least two light sources is illuminated the second color is displayed.

6. The method of claim 5 further comprising a third light source located in the housing and being visible from outside the housing such that when the third light source is illuminated a third color is displayed.

7. The method of claim 6, wherein when the third color is different from the first and second colors.

8. The method of claim 7, wherein the first color is green, the second color is red and the third color is white.

9. The method of claim 5, wherein the first light source is located within a first covered section within the housing and the second light source is located within a second covered section within the housing.

10. The method of claim 9, wherein the first covered section is separated from the second covered section by a barrier having a reflective surface.

11. The method of claim 1, wherein the housing is configured to be water-resistant.

12. The method of claim 1 further comprising controlling operation of the light source using a user interface.

13. The method of claim 12 further comprising selecting a flashing mode using the user interface during which the light source and/or the beacon light flashes in a predetermined pattern.

14. The method of claim 1, wherein the housing is buoyant.

15. The method of claim 1 further comprising a whistle carried by the wearable structure.

\* \* \* \* \*